PROCESS FOR PURIFICATION OF NITROCELLULOSE

The U.S. Government has rights to this invention pursuant to Contract DAAA09-77-C-4007 issued by the U.S. Department of the Army.

This invention relates to a process of purifying nitrocellulose containing residual acid from the nitrating step in preparation of the nitrocellulose.

BACKGROUND AND PRIOR ART

Nitrocellulose resulting from the nitration of cellulose contains residual acids which must be removed from the nitrocellulose. Nitrocellulose resulting from nitration of the cellulose has a high viscosity which must be reduced so that proper rheological properties are obtained. This is particularly necessary when employing nitrocellulose in propellant as a major component thereof in order to insure propellant stability and adequate mechanical properties. Illustrative prior art processes for stabilization of nitrocellulose containing residual acidic components are described below.

U.S. Pat. No. 1,818,733 describes a process for reducing the viscosity of nitrocellulose, increasing its stability and for purification. In the process described a mixture of nitrocellulose and water is pumped at a high velocity (about 2 feet per second) through a long coil at a pressure of about 80 psi. The temperature of the nitrocellulose and water is from about 130° C. to 160° C. but temperatures as high as 180° C. are stated to be permissible. These conditions result in a reduction of the nitrogen content of the nitrocellulose and severely reduce the nitrocellulose viscosity to the point that it is unacceptable for normal propellant manufacture. The nitrocellulose is considered lacquer grade, suitable for use in plastics and paints. U.S. Pat. No. 1,911,201 discloses a modified operatus for use in conducting the process described in U.S. Pat. No. 1,818,733.

U.S. Pat. No. 2,366,880 discloses a process for the purification of nitrocellulose. In this process, preliminary steps of wringing, drowning, boiling and pulping of the nitrocellulose precede the inventive step of poaching. In the poaching step of the process the nitrocellulose is boiled first in an aqueous alkaline solution and then in water. The nitrocellulose is then separated from the liquor associated therewith after boiling continuously by continuously filtering the nitrocellulose forming a mat of nitrocellulose. The resulting mat is washed with water.

U.S. Pat. No. 2,776,965 relates to a process for the manufacture of nitrocellulose. In this invention, nitric acid esters of cellulose are produced by reacting cellulose with a nitrating mixture containing essentially nitric acid, magnesium nitrate and water, the ratio of magnesium nitrate to water being at least 1.2/1 and not more than about 2.2/1. After nitration the spent nitrating mixture is removed from the resulting nitric acid esters and stable nitric acid esters of cellulose are recovered directly.

U.S. Pat. No. 1,757,481 discloses an improvement in a method for reducing the viscosity of nitrocellulose. In the process disclosed nitrocellulose is boiled in water under pressure in an autoclave for at least 8 hours. In the process water is circulated into and out of the autoclave and from time to time an alkaline agent sufficient to maintain neutrality of the water is introduced into the circulating water. The water level in the autoclave is maintained at a level sufficient so that the nitrocellulose is immersed in the boiling solution. Undesired products are removed from the boiling solution by the introduction of steam under pressure below the water level and by the simultaneous withdrawal of any excess water at such level.

U.S. Pat. No. 2,077,455 discloses a process for reducing the quantity of residual acids in unpurified nitrated cellulose. In this process acid-wet nitrocellulose having a nitrogen content of 11.9% is first washed with 2 or 3 changes of water, the last wash being slightly alkaline, until the final water has an approximate pH value of 5 or higher. The nitrocellulose is then boiled with 10-15 times its weight of a 0.05% to 1% solution of an alkali or alkaline earth nitrite for from 3 to 4 hours. It is then washed substantially free from nitrite by means of 2 to 3 changes of fresh water.

U.S. Pat. No. 2,297,734 discloses a process for the stabilization of nitrocellulose which comprises water washing nitrocellulose to remove most of its free acid, stirring the nitrocellulose in a large excess of hot water for several hours, filtering the nitrocellulose, stirring the nitrocellulose into a cold 1-3% solution of sodium bicarbonate in water for from one hour to several days, filtering and washing the nitrocellulose with water until only a small amount of the sodium bicarbonate remains in the nitrated product, preferably an amount which produces a pH of 7.1 to 8.2 in the water. The resulting nitrocellulose is then stirred into a 0.1%–0.2% solution of dicyandiamide. The resulting nitrocellulose is said to be free from color and satisfactorily stabilized.

SUMMARY OF THE INVENTION

This invention comprises a process for purifying both commercial and military grades of nitrocellulose. In the process of this invention, unpurified nitrocellulose containing residual acid from nitration is washed with water and cut to produce small nitrocellulose fibers. The resulting slurry of cut fibers is heated to a temperature of from about 100° C. to 150° C. at a pressure of from about atmospheric to about 60 psi (gauge). During this heating step an alkaline agent is continuously added to the slurry to bring the pH to at least 8. After a relatively short time, say not to exceed about 2 hours, purified nitrocellulose is recovered after washing with water either by draining in an open vessel or by filtration. The purified nitrocellulose exhibits reduced viscosity, satisfactory stability and minimum reductions in nitrogen content.

DETAILED DESCRIPTION OF THE INVENTION

In accordance with this invention, a process is provided for purification and viscosity reduction of unpurified nitrocellulose containing residual acid from the nitration step in the preparation of the nitrocellulose, said process comprising:

(a) cutting the unpurified nitrocellulose fibers in water forming an aqueous slurry of nitrocellulose fibers comprising a dispersed nitrocellulose fiber phase and a continuous liquid phase, (b) adjusting the pH of such slurry to at least about 8 with a basic solution, (c) heating the resulting slurry to an elevated temperature and elevated pressure of from about 100° C. to about 150° C. and from about atmospheric pressure to about 60 psi (gauge), and continuously maintaining the pH of the slurry at least about 8 by

ANTHRAQUINONE-AZOMETHINE COMPOUNDS, PROCESSES FOR THEIR PREPARATION AND PROCESSES FOR PIGMENTING ORGANIC MACROMOLECULAR SUBSTANCES

The invention relates to anthraquinone-azomethine compounds which, in one of their tautomeric structures, correspond to the formula

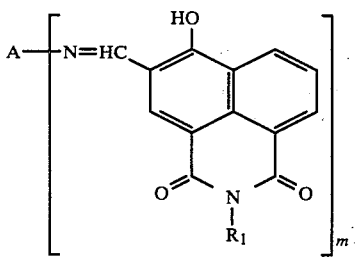

processes for their preparation and their use as pigments.

A further tautomeric structure of the pigments according to the invention corresponds to the formula

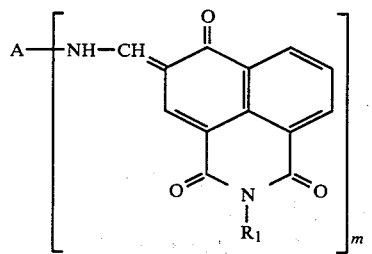

For simplicity, in each case only the tautomeric form represented by formula (I) is given in the following text. However, it is pointed out that this does not mean a limitation of the invention with regard to a particular tautomer.

In the formula (I),

A denotes an anthraquinone radical which is free from sulphonic acid groups and is optionally further substituted and which preferably consists of at most 5 fused rings, $R_1$ denotes hydrogen, optionally substituted aryl, preferably

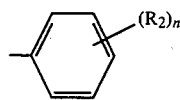

hetero-aryl, cycloalkyl or $C_1$-$C_{12}$-alkyl, it being possible for the alkyl chain to be interrupt by oxygen or sulphur and/or to be substituted by hydroxyl groups or $N(R_3)_2$ groups, —$N(R_3)_2$ or

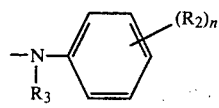

$R_2$ denotes a substituent, $R_3$ denotes hydrogen, $C_1$-$C_4$-alkyl, cycloalkyl or optionally substituted aryl, m denotes 1, 2, 3 or 4 and n denotes 0, 1, 2, 3, 4 or 5.

Examples of suitable substituents $R_2$ are halogen, such as chlorine and bromine, $C_1$-$C_4$-alkyl, $C_1$-$C_4$-alkoxy, nitro, trifluoromethyl, cyano, optionally substituted carbamoyl, optionally substituted sulphamoyl, acylamino or optionally substituted arylamino.

Optionally substituted aryl ($R_1$, $R_3$) is preferably phenyl, which can be substituted by the radicals mentioned for $R_2$.

Possible substituents of the carbamoyl and sulphamoyl groups are $C_1$-$C_4$-alkyl, phenyl which is optionally substituted by $C_1$-$C_4$-alkyl, $C_1$-$C_4$-alkoxy, fluorine, chlorine, bromine or nitro, and benzyl.

Acylamino is, in particular, $C_1$-$C_4$-alkylcarbonylamino, and benzoylamino which is optionally substituted in the benzene nucleus by chlorine, $C_1$-$C_4$-alkyl, $C_1$-$C_4$-alkoxy or nitro.

Optionally substituted arylamino is, in particular, phenylamino which is optionally substituted by $C_1$-$C_4$-alkyl, $C_1$-$C_4$-alkoxy, fluorine, chlorine, bromine or nitro.

Cycloalkyl ($R_1$, $R_3$) represents, in particular, $C_3$-$C_7$-cycloalkyl, preferably cyclopentyl and cyclohexyl.

Suitable amino-anthraquinones of the formula $$A\text{-}(NH_2)_m \qquad (III)$$

wherein m has the abovementioned meaning, are: 1-amino-anthraquinone, 2-amino-anthraquinone, 1-amino-2-chloro-anthraquinone, 1-amino-4-chloroanthraquinone, 1-amino-5-chloro-anthraquinone, 1-amino-6-chloroanthraquinone, a mixture of 1-amino-6- and -7-chloroanthraquinone, 1-amino-5,8-dichloroanthraquinone, 1-amino-2-bromoanthraquinone, 1-amino-2,4-dibromoanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetyl-anthraquinone, 1-amino-5-benzoylaminoanthraquinone, 1-amino-4-benzoylaminoanthraquinone, 1-amino-4-hydroxy-anthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-aminoanthrapyridone, 3-methyl-7-amino-anthrapyridone, 4-amino-1,9-pyrazolanthrone, 5-amino-1,9-pyrazolanthrone, 4-amino-1,9-anthrapyrimidine, 5-amino-1,9-anthrapyrimidine, 1,5-diaminoanthraquinone, 1,4-diamino-anthraquinone, 1,8-diaminoanthraquinone, 2,6-diaminoanthraquinone, 1,5-diamino-4-chloroanthraquinone, 1,4-diamino-5-nitroanthraquinone, 1,5-diamino-2,4,6,8-tetrabromoanthraquinone, 1,5-diamino-4,8-dihydroxyanthraquinone, 1,8- diamino-4,5-dihydroxyanthraquinone, 4,4'-diamino-1,1'-dianthrimide, 1-amino-8-benzoylaminoanthraquinone, 1-amino-2-bromo-4-(4-methylbenzenesulphonylamino)-anthraquinone, 1-amino-4-(2-chlorobenzoylamino)-anthraquinone, 1-amino-4-(3-chlorobenzoylamino)-anthraquinone, 1-amino-4-(2,5-dichlorobenzoylamino)-anthraquinone, 1-amino-4-(2,3,4,5-tetrachlorobenzoylamino)-anthraquinone, 1-amino-4-(3-nitrobenzoylamino)-anthraquinone, 1-amino-5-(2-chlorobenzoylamino)-anthraquinone, 1-amino-5-(3-chlorobenzoylamino)-anthraquinone, 1-amino-5-(4-chlorobenzoylamino)-anthraquinone, 1-amino-5-(2,5-dichlorobenzoylamino)-anthraquinone, 1-amino-5-(2,3,4,5-tetrachlorobenzoylamino)-anthraquinone, 1-amino-5-(3-nitrobenzoylamino)-anthraquinone, 1-amino-8-(2-chlorobenzoylamino)-anthraquinone, 1-amino-8-(3-chlorobenzoylamino)-anthraquinone, 1-amino-8-(4-chlorobenzoylamino)-anthraquinone, 1-amino-8-(2,5-dichlorobenzoylamino)-anthraquinone, 1-amino-8-(2,3,4,5-tetrachlorobenzoylamino)-anthraquinone, 1-amino-8-(3-nitrobenzoylamino)-anthraquinone, 1-amino-6,7-dichloroanthraquinone, 1-amino-6-fluoroanthraquinone and 1-amino-2-methyl-4-chloroanthraquinone.

Preferred anthraquinone-azomethine pigments correspond to the formula

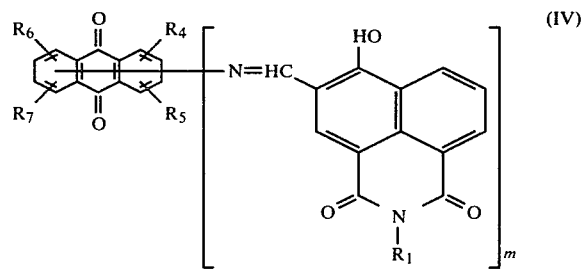

wherein $R_1$ and m have the meaning indicated above, $R_4$ denotes hydrogen, halogen, such as fluorine, chlorine and bromine, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$–$C_4$-alkyl, $C_1$–$C_4$-alkoxy, chlorine or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine or nitro, or benzenesulphonylamino which is optionally substituted by $C_1$–$C_4$-alkyl, $C_1$–$C_4$-alkoxy, fluorine, chlorine, bromine or nitro, $R_5$ denotes hydrogen, chlorine, hydroxyl or methyl, $R_6$ denotes hydrogen, halogen, such as fluorine, chlorine or bromine, nitro $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkoxycarbonyl, $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted $C_1$–$C_4$-alkyl, $C_1$–$C_4$-alkoxy, fluorine, chlorine, bromine or nitro, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or benzenesulphonylamino which is optionally substituted by $C_1$–$C_4$-alkyl, $C_1$–$C_4$-alkoxy, fluorine, chlorine, bromine or nitro and $R_7$ denotes hydrogen, halogen, such as fluorine, chlorine and bromine, or hydroxyl.

Anthraquinone-azomethine pigments of the formula

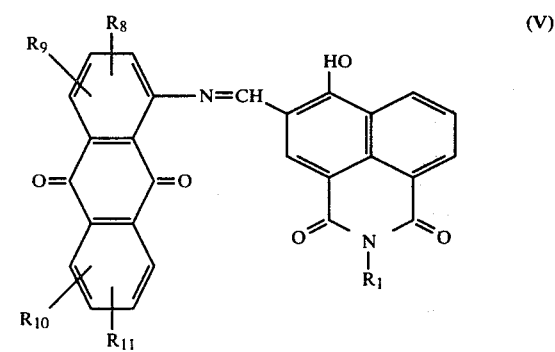

wherein $R_1$ has the meaning indicated above and $R_8$, $R_9$, $R_{10}$ and $R_{11}$ denote hydrogen, chlorine, bromine, carboxyl, $C_1$–$C_4$-alkoxycarbonyl, carbamoyl, $C_1$–$C_4$-alkylcarbonylamino, benzoylamino which is optionally substituted by 1 or 2 nitro groups or 1 to 5 chlorine or bromine atoms, $C_1$–$C_4$-alkylsulphonylamino, benzenesulphonylamino which is optionally substituted by methyl, methoxy or chlorine, or a radical of the formula

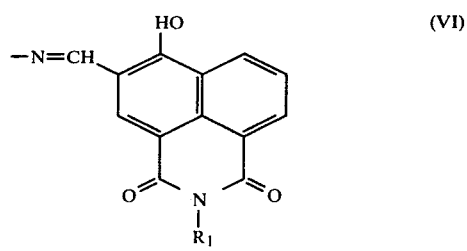

are particularly preferred.

The preparation of the anthraquinone-azomethine pigments (I) from the aminoanthraquinones of the formula

and the appropriately substituted 4-hydroxy-naphthalimides of the formula

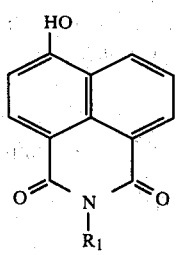

(VII)

in which $R_1$ has the abovementioned meaning, can be effected by several processes.

(1) The appropriately substituted 4-hydroxy-naphthalimides of the formula (VII) are subjected to a condensation reaction with an orthoformic acid trialkyl ester of the formula $$HC(OR)_3 \qquad (VIII)$$

in which R preferably represents a $C_1$–$C_4$-alkyl group, at 100°–220° C. in an organic solvent which is inert towards the reactants, and the resulting appropriately substituted 3-alkoxymethylene-4-hydroxy-naphthalimides of the formula

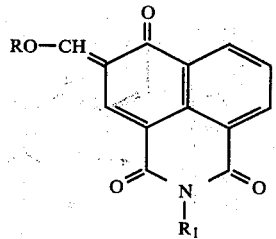

(IX)

in which $R_1$ has the abovementioned meaning, are then reacted with an amino-anthraquinone of the formula $$A\text{-}(NH_2)_m \qquad (III)$$

at 100°–220° C., preferably 120°–180° C., in the same organic reaction medium or in another organic reaction medium.

(2) The amino-anthraquinones of the formula $$A\text{-}(NH_2)_m \qquad (III)$$

are subjected to a condensation reaction with an orthoformic acid trialkyl ester of the abovementioned formula (VIII) at 100°–220° C., preferably 120°–180° C., in an organic solvent which is inert towards the reactants, and the resulting formimino-esters of the formula $$A\text{-}(N\!=\!CH\!-\!OR)_m \qquad (X)$$

in which R preferably represents a $C_1$–$C_4$-alkyl group, are then reacted with appropriately substituted 4-hydroxynaphthalimides of the abovementioned formula (VII) at 100°–220° C., preferably 120°–180° C., in the same organic reaction medium or in another organic reaction medium.

Suitable organic solvents for processes (1) and (2) are aromatic and hetero-aromatic compounds, such as toluene, chlorobenzene, pyridine, o-dichlorobenzene, 1,2,4-trichlorobenzene or nitrobenzene, alcohols, such as butanol or diethylene glycol monomethyl ether, ethers, such as ethylene glycol dimethyl ether or ethylene glycol diethyl ether, or dipolar aprotic solvents, such as dimethylformamide, dimethylacetamide, N-methylpyrrolidone, tetramethylurea, dimethylsulphoxide or tetramethylene sulphone.

(3) In another process, the amino-anthraquinones of the formula $$A\text{-}(NH_2)_m \qquad (III)$$

are converted into the corresponding formamidinium halides of the formula $$A\text{-}[NH\!-\!CH\!=\!\overset{\ominus}{N}(R)_2]_m X^{\oplus}{}_m \qquad (XI)$$

wherein

R preferably represents a $C_1$–$C_4$-alkyl group and

X represents chlorine or bromine, with a dialkylformamide and a thionyl halide, in particular thionyl chloride, at 40°–100° C., preferably 40°–80° C., in an organic solvent which is inert towards the reactants, and the resulting formamidinium halides (XI) are subjected to a condensation reaction with appropriately substituted 4-hydroxy-naphthalimides of the abovementioned formula (VII) at 100°–220° C., preferably 120°–180° C., in the same solvent or in another organic solvent, and in the presence of an acid-binding agent.

Suitable organic solvents for process (3) are, in particular, aromatic hydrocarbons, such as toluene, chlorobenzene, o-dichlorobenzene, 1,2,4-trichlorobenzene or nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylene sulphone.

The dialkylformamides used are preferably lower dialkylformamides, such as dimethylformamide or diethylformamide, but it is also possible to employ cyclic alkyl-carboxylic acid amides, such as N-methylpyrrolidone.

The acid-binding agents used in process (3) are alkali metal hydroxides or carbonates or alkaline earth metal hydroxides or carbonates, or alkali metal salts or alkaline earth metal salts of aliphatic carboxylic acids, preferably sodium carbonate, bicarbonate or acetate or potassium carbonate, bicarbonate or acetate.

The compounds of the formula (I) are obtained in a form suitable for use as pigments, or they can be converted into a suitable form by known after-treatment processes, for example by dissolving or swelling in strong inorganic acids, such as sulphuric acids, and discharging the solution onto ice. Fine division can also be achieved by grinding, with or without grinding auxiliaries, such as inorganic salts or sand, if appropriate in the presence of solvents, such as toluene, xylene, dichlorobenzene or N-methylpyrrolidone. The tinctorial strength and transparency of the pigment can be influenced by varying the after-treatment.

Because of their fastness to light and migration, the anthraquinone-azomethine pigments of the formula (I) are suitable as pigments for the most diverse applications. The pigments can be used to prepare very fast pigmented systems, such as mixtures with other substances, formulations, paints, printing pastes, coloured paper and coloured macromolecular substances. Mixtures with other substances can be understood, for example, as those with inorganic white pigments, such as titanium dioxide (rutile) or with cement. Formulations are, for example, flush pastes with organic liquids or pastes and fine pastes with water, dispersing agents and, if appropriate, preservatives. The term paint means, for example, lacquers which dry physically or by oxidation, stoving lacquers, reactive lacquers, two-component lacquers, emulsion paints for weather-resistant coatings and distempers. Printing pastes are to be understood as those for paper printing, textile printing and tinplate printing. The macromolecular substances can be of natural origin, such as rubber, or they can be obtained by chemical modification, such as acetylcellulose, cellulosebutyrate or viscose, or synthetically produced, such as polymers, polyaddition products and polycondensates. Examples which may be mentioned are plastic compositions, such as polyvinyl chloride, polyvinyl acetate, polyvinyl propionate, polyolefines, for example polyethylene, or polyamides, high-molecular weight polyamides, polymers and copolymers of acrylates, methacrylates, acrylonitrile, acrylamide, butadiene and styrene, and polyurethanes and polycarbonates. The substances pigmented with the products claimed can be in any desired form.

The pigments (I) according to the invention are furthermore outstandingly fast to water, oil, acid, lime, alkali, solvents, over-lacquering, over-spraying and sublimation and outstandingly stable to heat and vulcanisation, and have a very high tinctorial strength and can readily be distributed in plastic compositions.

EXAMPLE 1

10.32 g of 95% pure 1-amino-4-benzoylamino-anthraquinone and 3.4 g of orthoformic acid trimethyl ester in 100 g of nitrobenzene are heated to 140°-150° C. for about 2-3 hours, the methanol formed being distilled off over a short bridge. When the starting material has disappeared, 6.5 g of 4-hydroxy-N-methyl-naphthalimide are introduced and the mixture is heated to 140°-150° C. for a further 4 hours. After cooling to 100° C., the pigment, which has crystallised in attractive long brown-red prisms, is filtered off and washed with hot nitrobenzene and methanol, and, after drying at 100° C., 15.3 g (92.2% of theory) of the red-brown pigment of the formula

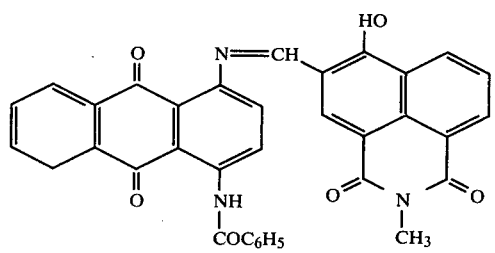

are obtained.

Calculated: C: 72.54; H: 3.63; N: 7.25; Found: C: 72.41; H: 3.70; N: 7.30.

Pigments with excellent properties and similar shades are obtained if 1-amino-4-(4-chlorobenzoylamino)-anthraquinone, 1-amino-4-(2,4-dichlorobenzoylamino)-anthraquinone, 1-amino-4-(3-nitrobenzoylamino)-anthraquinone or 1-amino-4-(4-acetylaminobenzoylamino)-anthraquinone is used instead of the above-mentioned 1-amino-4-benzoylamino-anthraquinone.

EXAMPLE 2

(a) 11 g of 97% pure 1-amino-anthraquinone and 5.8 g of orthoformic acid trimethyl ester in 120 g of nitrobenzene are stirred at 140°-145° C. for about 3 hours, the methanol formed being distilled off over a bridge and the formation of the formimino-ester of the formula

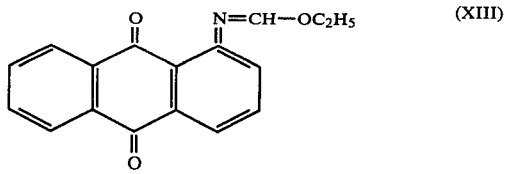

being followed by thin layer chromatography. When the 1-amino-anthraquinone has disappeared, 11.4 g of 4-hydroxy-N-methylnaphthalimide are added to the reaction mixture and the mixture is heated for a further 2-3 hours to 145°-150° C. Thereafter, it is allowed to cool to 100° C. and the pigment, which has crystallised out in brown-orange coloured needles, is washed with hot nitrobenzene and methanol and dried at 100° C. 21.1 g (93% of theory) of the yellow-red pigment of the formula

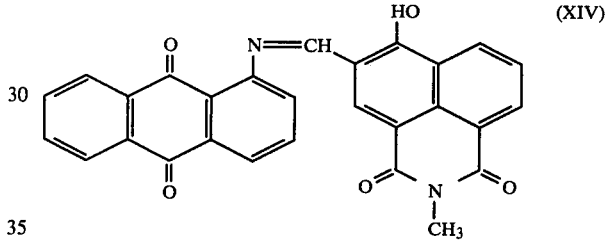

are thus obtained.

Calculated: C: 73.04; H: 3.48; N: 6.09; Found: C: 72.89; H: 3.39; N: 5.98.

The pigment can also have the tautomeric structure of the following formula:

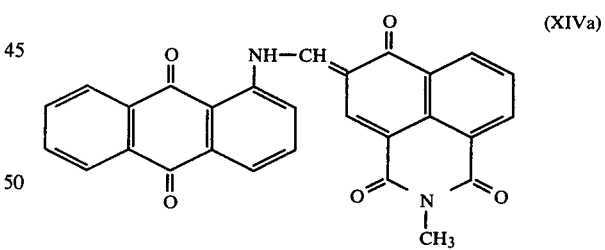

(b) 7.3 g of thionyl chloride are added to 11 g of 97% pure 1-amino-anthraquinone, 4 g of dimethylformamide and 90 g of nitrobenzene at 50°-60° C. in the course of 1 hour, and the mixture is stirred until the formamidinium chloride of the formula

has formed, that is to say for about a further hour. The reaction mixture is subsequently stirred in vacuo for a further hour to remove the excess thionyl chloride, 11.4 g of 4-hydroxy-N-methylnaphthalimide and 12.5 g of anhydrous sodium acetate are then added successively and the mixture is heated to 150°–160° C. in the course of about 1 hour. It is stirred at 150°–160° C. until formation of the pigment, which crystallises in brown-orange coloured prisms, has ended and the pigment is then filtered off at 100° C. and washed with hot nitrobenzene and with methanol and water, and, after drying, 20.2 g (89% of theory) of the yellow-red pigment, which is identical to that from Example 2a, are obtained.

(c) Yellow-red anthraquinone pigments are obtained when 1-amino-anthraquinone are employed in the processes described in Example 2a or 2b, and 4-hydroxy-naphthalimides of the formula (VII) are used:

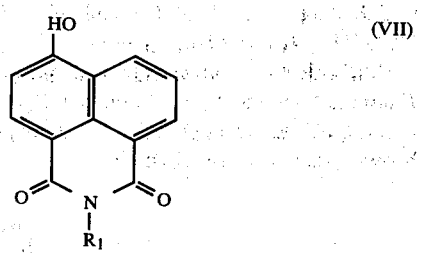

wherein $R_1$ denotes H, $C_2H_5$, $C_4H_9$, —$CH_2$—$CH_2$—OH, —$CH_2$—$CH_2$—$OCH_3$, —$(CH_2)_{11}$—$CH_3$,

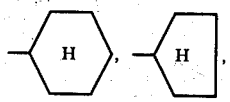

—$CH_2$—$CH_2$—$CH_2$—S—$CH_3$, —$CH_2$—$CH_2$—$N(CH_3)_2$,

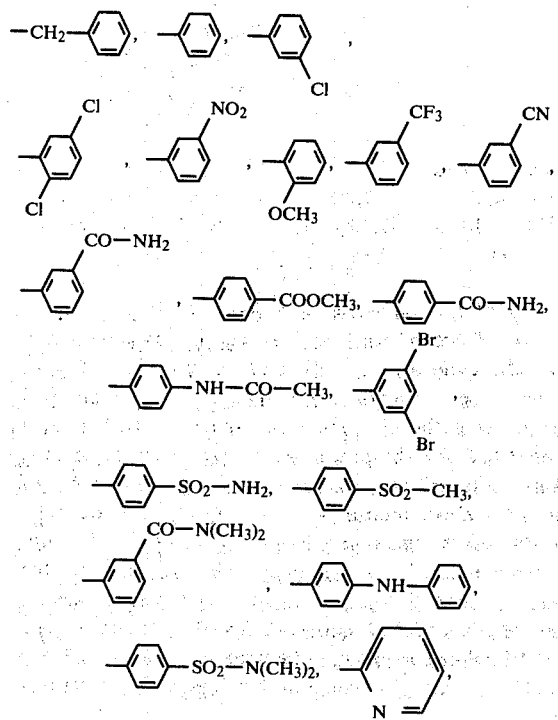

-continued

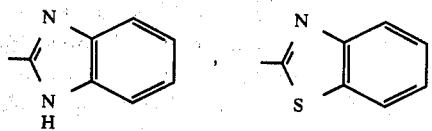

—NH—$CH_3$, —N($CH_3$)$_2$,

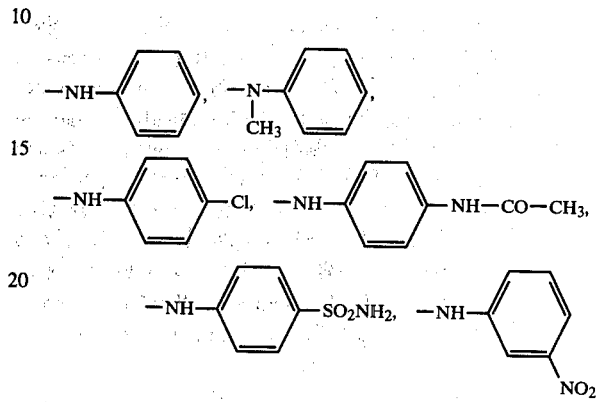

or —N($C_6H_5$)$_2$

Pigments with excellent properties and similar colour shades are obtained if the following 1-amino-anthraquinone derivatives are employed in Examples 2a or 2b instead of the 1-amino-anthraquinone used in those examples: 1-amino-4-chloro-anthraquinone, 1-amino-5-chloro-anthraquinone, 1-amino-6- and -7-chloroanthraquinone, 1-amino-6,7-dichloro-anthraquinone, 1-amino-2,4-dibromo-anthraquinone, 1-amino-6-fluoro-anthraquinone, 1-amino-4-nitro-anthraquinone, 1-amino-5-nitro-anthraquinone, 1-amino-anthraquinone-2-carboxylic acid amid and 1-amino-2-acetyl-anthraquinone.

EXAMPLE 3

8.5 g of 87% pure 1-amino-5-benzoylamino-anthraquinone and 3 g of orthoformic acid trimethyl ester in 75 g of nitrobenzene are heated to 140°–150° C. for about 2–3 hours, the methanol formed being distilled off over a short bridge. When the starting material has disappeared, 6.5 g of 4-hydroxy-N-methylnaphthalimide are introduced and the mixture is heated to 145°–150° C. for a further 4 hours. After cooling to 100° C., the pigment, which has crystallised in yellow-brown prisms, in filtered off and washed with hot nitrobenzene and methanol, and, after drying at 100° C., 11.9 g (95% of theory) of the red-brown pigment of the formula

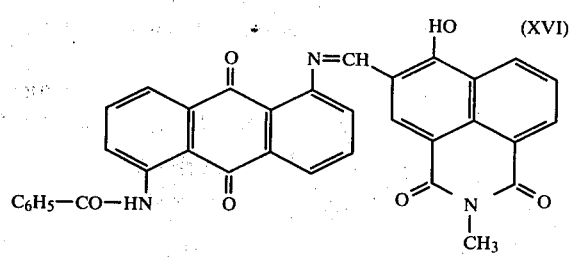

are obtained.

Calculated: C: 70.47; H: 3.63; N: 7.25; Found: C: 70.59; H: 3.60; N: 7.20.

The pigment is obtained with similar yields if the following solvents are used instead of nitrobenzene: o-dichlorobenzene, 1,2,4-trichlorobenzene, diethylene glycol monoethyl ether, diethylene glycol dimethyl ether, dimethylformamide, N-methylpyrrolidone, dimethylsulphoxide or tetramethylene sulphone.

EXAMPLE 4

11.8 g of 1-amino-4-hydroxy-anthraquinone and 8.5 g of orthoformic acid triethyl ester in 120 g of nitrobenzene are stirred at 140°–145° C. for about 3 hours, the ethanol formed being distilled off over a bridge. When the starting material has disappeared, 7.6 g of 4-hydroxy-N-methyl-naphthalimide are introduced and the mixture is heated to 140°–150° C. for a further 4 hours. After cooling to 100° C., the pigment, which has crystallised in attractive dark red needles, is filtered and washed with hot nitrobenzene and methanol, and, after drying at 100° C., 21.4 g (91% of theory) of the violet-brown pigment of the formula

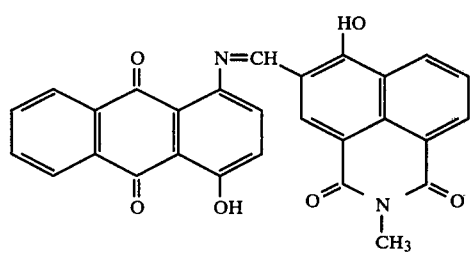

are obtained.

Calculated: C: 70.59; H: 3.36; N: 5.88; Found: C: 70.42; H: 3.40; N: 5.95.

EXAMPLE 5

5.5 g of 1,5-diamino-anthraquinone and 8.8 g of orthoformic acid triethyl ester in 80 g of nitrobenzene are heated to 145°–150° C. for about 3 hours, the ethanol formed being distilled off over a bridge and the disappearance of the starting material being followed by thin layer chromatography. 10.6 g of 4-hydroxy-N-methyl-naphthalimide are now added and the mixture is heated to 140°–150° C. until formation of the pigment has ended, which takes about 4 hours. Thereafter, the pigment, which has crystallised in yellow-brown prisms, is filtered off at 120° C. and washed with hot nitrobenzene and methanol, and, after drying at 100° C., 15.4 g (93.8% of theory) of the black-brown pigment of the formula

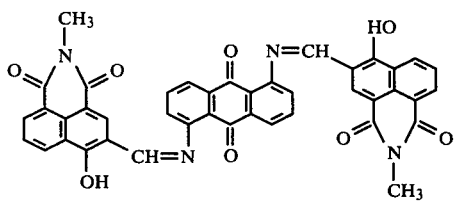

are obtained.

Calculated: C: 70.99; H: 3.38; N: 7.89; Found: C: 70.85; H: 3.50; N: 7.96.

If 5.5 g of 1,8-diamino-anthraquinone are used in Example 5 instead of the abovementioned 1,5-diamino-anthraquinone, 14.8 g (90.2% of theory) of the black-brown pigment of the formula

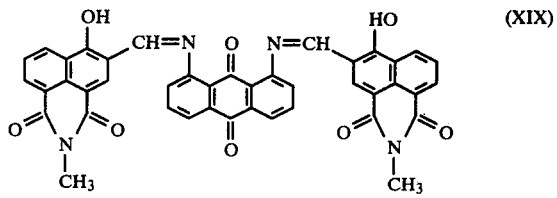

are obtained.

Calculated: C: 70.99; H: 3.38; N: 7.89; Found: C: 70.89; H: 3.42; N: 7.86.

If 5.5 g of 1,4-diamino-anthraquinone are employed in Example 5 instead of the abovementioned 1,5-diamino-anthraquinone, 15.6 g (95.1% of theory) of the dark-brown pigment of the formula

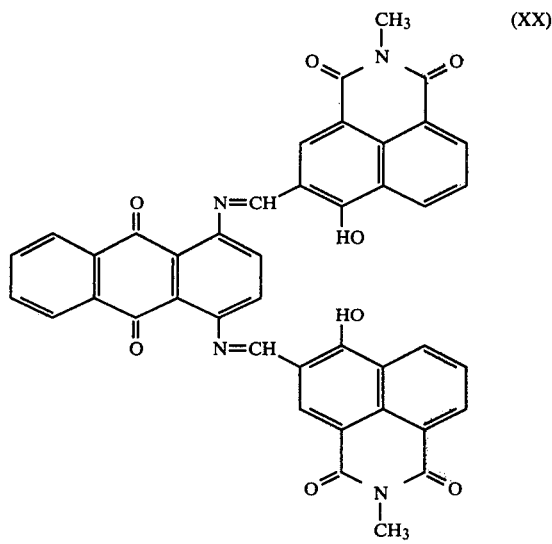

are obtained.

Calculated: C: 70.99; H: 3.38; N: 7.89; Found: C: 71.11; H: 3.47; N: 7.82.

EXAMPLE 6

5 g of 1,5-diamino-4,8-dihydroxy-anthraquinone and 4.4 g of orthoformic acid trimethyl ester in 75 g of nitrobenzene are heated to 145°–150° C. for about 3 hours, the methanol formed being distilled off over a bridge and the disappearance of the starting material being followed by thin layer chromatography. 9.6 g of 4-hydroxy-N-(2-hydroxyethyl)-naphthalimide are now added and the mixture is heated to 160°–170° C. until formation of the pigment has ended. Thereafter, the pigment, which has crystallised in black needles, is filtered off at 120° C. and washed with hot nitrobenzene and methanol, and, after drying at 100° C., 13.9 g (93.4% of theory) of the blue-black pigment of the formula

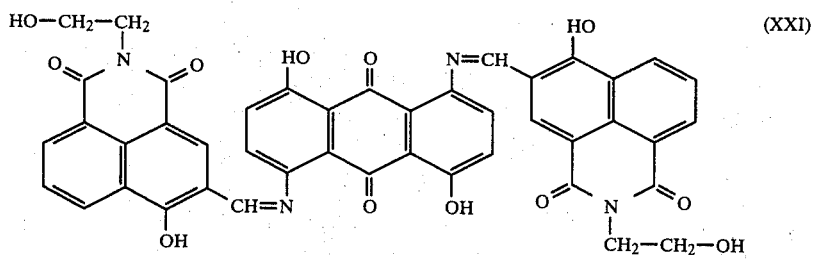

are obtained.
Calculated: N: 6.97; Found: N: 6.89.

If 5 g of 1,8-diamino-4,5-dihydroxy-anthraquinone are used in Example 6 instead of the 1,5-diamino-4,8-dihydroxy-anthraquinone, 14.1 g (94.7% of theory) of the blue-black pigment of the formula

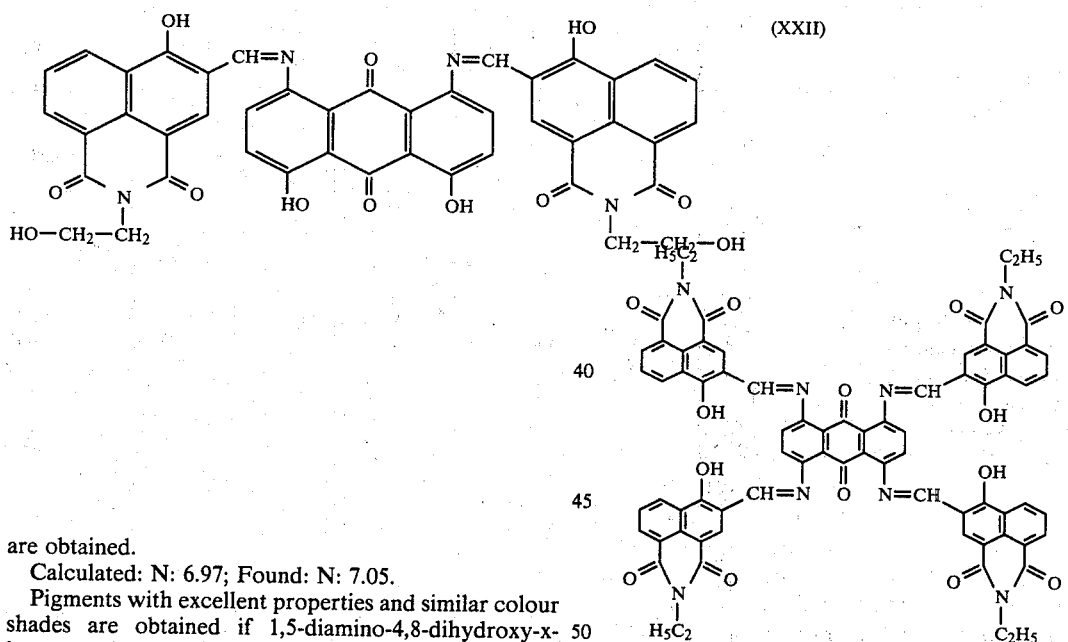

are obtained.
Calculated: N: 6.97; Found: N: 7.05.

Pigments with excellent properties and similar colour shades are obtained if 1,5-diamino-4,8-dihydroxy-x-bromo-anthraquinone or 1,8-diamino-4,8-dihydroxy-x-bromo-anthraquinone is employed in Example 6 instead of the 1,5-diamino-4,8-dihydroxy-anthraquinone used in the example.

EXAMPLE 7

3.4 g of 1,4,5,8-tetraamino-anthraquinone, and 9 g of orthoformic acid triethyl ester in 125 g of nitrobenzene are heated to 145°–150° C. for 3–4 hours, the ethanol formed being distilled off over a bridge and the disappearance of the starting material being followed by thin layer chromatography. 12.3 g of 4-hydroxy-N-ethyl-naphthalimide are now added and the mixture is heated to 175°–180° C. until formation of the pigment, in black prisms, has ended. Thereafter, the pigment is filtered off at 120° C. and washed with hot nitrobenzene and methanol, and, after drying at 100° C., 14.1 g (91.1% of theory) of the blue-black pigment of the formula are obtained.
Calculated: N: 9.18; Found: N: 9.29.

EXAMPLE 8

13.4 g of 1-amino-4,5,8-trihydroxy-anthraquinone and 8.8 g of orthoformic acid triethyl ester in 80 g of nitrobenzene are heated to 145°–150° C. for about 3 hours, the ethanol formed being distilled off over a bridge and the disappearance of the starting material being followed by thin layer chromatography. 16 g of 4-hydroxy-(N-4-chlorophenyl)-naphthalimide are now added and the mixture is heated to 155°–160° C. until formation of the pigment has ended. After cooling to 110° C., the pigment, which has crystallised in yellow-brown prisms, is filtered off and washed with hot nitrobenzene and methanol, and, after drying at 100° C., 26 g (87% of theory) of the brown pigment of the formula

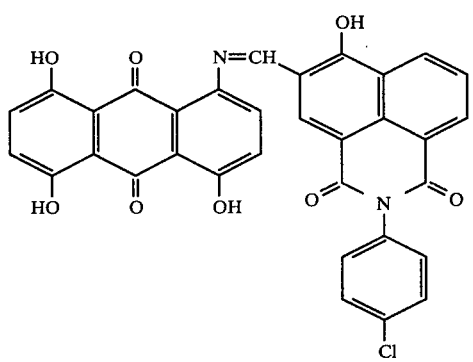

are obtained.

Calculated: N: 4.63; Cl: 5.87; Found: N: 4.71; Cl: 5.81.

If, instead of 1-amino-4,5,8-trihydroxy-anthraquinone, equivalent amounts of the amino-anthraquinones listed in Table 1 are used in Example 8, corresponding pigments with the colour shades indicated in the table are obtained.

TABLE 1

| Example | Amino-anthraquinone | Colour shade of the resulting pigment |
|---|---|---|
| 9 | 1-amino-4,8-dihydroxy-anthraquinone | brown |
| 10 | 1-amino-2-bromo-4-hydroxy-anthraquinone | yellow-brown |
| 11 | 1-amino-4-anilino-anthraquinone | black |

EXAMPLE 12

5.5 g of 97% pure 1-amino-anthraquinone and 3 g of orthoformic acid trimethyl ester in 60 g of nitrobenzene are heated to 145°–150° C. for about 3 hours, the methanol formed is distilled-off over a bridge and the disappearance of the starting material being followed by thin layer chromatography. 5.1 g of 4-hydroxy-naphthalimide are now added and the mixture is heated to 145°–150° C. until formation of the pigment has ended. After cooling, the product, which has crystallised in red-brown prisms, is filtered off and washed with nitrobenzene and methanol, and, after drying, 10.3 g (96.5% of theory) of the red-brown pigment of the formula

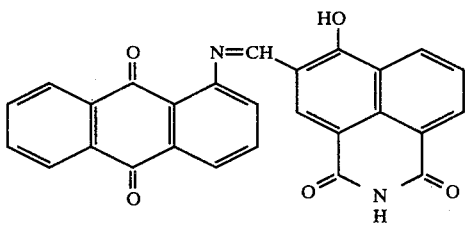

are obtained.

Calculated: N: 6.28; Found: N: 6.33.

If 8.5 g of 1-amino-4-benzoylamino-anthraquinone are used instead of the abovementioned 1-amino-anthraquinone, 13.2 g of the pigment of the formula

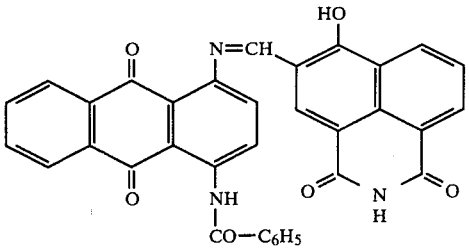

which crystallises in attractive dark brown needles, are obtained.

Calculated: N: 7.43; Found: N: 7.52.

If 5 g of 1,5-diamino-anthraquinone in 75 g of nitrobenzene are reacted with 5 g of orthoformic acid trimethyl ester and the product is then reacted with 10.2 g of 4-hydroxy-N-(methylamino)-naphthalimide, according to Example 12, 15.2 g (97.5% of theory) of the pigment of the formula

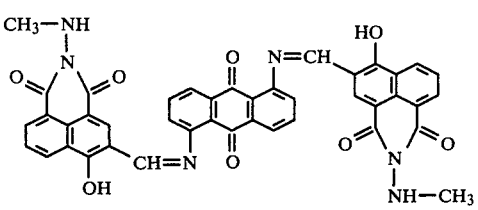

which crystallises in red-brown prisms, are obtained.

Calculated: N: 11.32; Found: N: 11.21.

EXAMPLE 13

11 g of 1-amino-anthraquinone and 5.8 of orthoformic acid trimethyl ester in 75 g of nitrobenzene are heated to 145°–150° C. for about 3 hours, the methanol formed being distilled off over a bridge. When the starting material has disappeared, 16.2 g of 4-hydroxy-N-(4-chlorophenylamino)-naphthalimide are added and the mixture is heated to 145°–150° C. until formation of the pigment has ended. After cooling the pigment, which has crystallised in red-brown needles, is filtered off and washed with nitrobenzene and methanol, and, after drying, 25.1 g (91.8% of theory) of the red-brown pigment of the formula

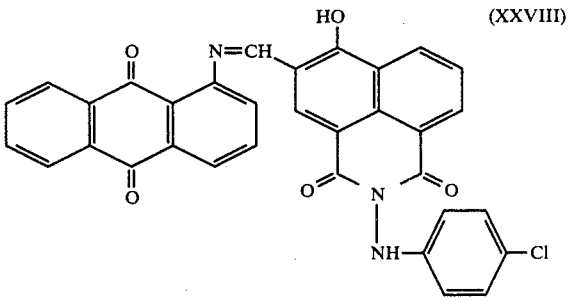

are obtained.

Calculated: N: 7.35; Cl: 6.21; Found: N: 7.42; Cl: 6.32.

EXAMPLE 14

12.6 g of 5-amino-1,9-isothiazolanthrone and 5.8 g of orthoformic acid trimethyl ester in 75 g of nitrobenzene are heated to 145°–150° C. for about 3 hours, the methanol formed being distilled off over a bridge. When the staring material has disappeared, 15.2 g of 4-hydroxy-N-(phenylamino)-naphthalimide are added and the mixture is heated to 145°–150° C. until formation of the pigment has ended. After cooling, the pigment, which has crystallised in yellow-brown prisms, is filtered off at 100° C. and washed with nitrobenzene and methanol, and, after drying, 25.7 g (90.8% of theory) of the pigment of the formula

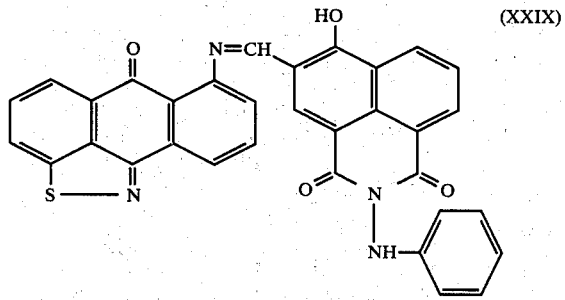

are obtained.

Calculated: N: 9.89; S: 5.65; Found: N: 9.78; S: 5.56.

Similar yellow-brown pigments are obtained if, instead of the abovementioned 5-amino-1,9-isothiazolanthrone, equivalent amounts of 4-amino- or 5-amino-1,9-pyrazolanthrone are employed.

EXAMPLE 15

(a) 8 g of the finely divided pigment obtained according to Example 1 are ground on an automatic Hoover-Muller grinder with a stoving lacquer consisting of 25 g of coconut oil alkyd resin (40% of coconut oil), 10 g of melamine resin, 50 g of toluene and 7 g of glycol monomethyl ether. The mixture is applied to the substrate to be lacquered and the lacquer is hardened by stoving at 130° C. to give red-brown lacquerings with very good fastness to over-lacquering and outstanding fastness to light and weathering.

Pigmented stoving lacquers with the same fastness properties are obtained if 15–25 g of the alkyd resin indicated or of an alkyd resin based on cottonseed oil, dehydrated castor oil, castor oil or synthetic fatty acids are used, and 10–15 g of the melamine resin mentioned or of a condensation product of formaldehyde with urea or with benzoguanamine are used instead of the amount of melamine resin indicated.

(b) If 1 to 10 g of a mixture of titanium dioxide (rutile type) with the pigment indicated in Example 15a in the ratio 0.5–50:1 are ground into the lacquer described in Example 15a instead of the amount of pigment indicated, the same further processing gives lacquerings with the same fastness properties and with a red-brown colour shade which shifts towards white with an increasing content of titanium dioxide.

EXAMPLE 16

6 g of finely divided pigment according to Example 1 are ground into 100 g of a nitrocellulose lacquer consisting of 44 g of collodion cotton (low-viscosity, 35% strength, butanol-moist), 5 g of dibutyl phthalate, 40 g of ethyl acetate, 20 g of toluene, 4 g of n-butanol and 10 g of glycol monomethyl ether. After brushing the lacquer onto a substrate and drying, red-brown lacquerings of outstanding fastness to light and over-lacquering are obtained. The same results are obtained using nitrocellulose lacquers which have a nitrocellulose content of 10–15 g and a plasticiser content of 5–10 g and contain 70–85 g of a solvent mixture, aliphatic esters, such as ethyl acetate and butyl acetate, and aromatics, such as toluene and xylene, and relatively small proportions of aliphatic ethers, such as glycol ether, and alcohols, such as butanol, preferably being used. By plasticisers there may be understood, for example: phthalates, such as dioctyl phthalate and dibutyl phthalate, esters of phosphoric acid, and castor oil, by itself or in combination with oil-modified alkyd resins.

Lacquerings with similar fastness properties are obtained using other spirit lacquers, Zapon lacquers and nitrocellulose lacquers which dry physically, air-drying oil varnishes, synthetic resin lacquers and nitrocellulose combination lacquers, and oven-drying and air-drying epoxide resin lacquers, if appropriate in combination with urea resins, melamine resins, alkyd resins or phenolic resins.

EXAMPLE 17

5 g of finely divided pigment according to Example 1 are ground in a porcelain ball mill with 100 g of an unsaturated polyester resin which dries without paraffin. 10 g of styrene, 59 g of melamine/formaldehyde resin and 1 g of a paste consisting of 40% of cyclohexanone peroxide and 60% of dibutyl phthalate are stirred thoroughly with the ground material, and finally b 4 g of dryer solution (10% strength cobalt naphthenate in white spirit) and 1 g of silicone oil solution (1% strength in xylene) are admixed. The mixture is applied to primed wood and a high-gloss, water-resistant red-brown lacquering which is fast to weathering and has outstanding fastness to light is obtained.

If amine-hardening epoxide resin lacquers with dipropylenediamine as the amine component are used instead of the reactive lacquer based on unsaturated polyester resins, red-brown lacquerings of outstanding fastness to weathering and effluorescence are obtained.

EXAMPLE 18

100 g of 65% strength solution of an aliphatic polyester, with about 8% of free hydroxyl groups, in glycol monomethyl ether-acetate are ground with 5 g of the pigment obtained according to Example 1, and the ground material is then mixed thoroughly with 44 g of a 67% strength solution of the reaction product of 1 mol of trimethylolpropane and 3 mols of toluylene diisocyanate. Without impairment of the pot life, after application of the mixture and reaction of the components, high-gloss red-brown polyurethane lacquerings of outstanding fastness to effluorescence, light and weathering result.

Pigmentations of similar fastness are obtained using other two-component lacquers based on aromatic or aliphatic isocyanates and polyethers or polyesters containing hydroxyl groups, and with polyisocyanate lacquers which dry in the presence of moisture and give polyurea lacquerings.

EXAMPLE 19

5 g of a fine paste obtained by kneading 50 g of the pigment obtained according to Example 1 with 15 g of an aryl polyglycol ether emulsifier and 35 g of water are mixed with 10 g of baryte, as the filler, 10 g of titanium dioxide (rutile type) as a white pigment, and 40 g of an aqueous emulsion paint containing about 50% of polyvinyl acetate. The paint is brushed onto the substrate and, after drying, red-brown paint films of very good fastness to lime and cement and outstanding fastness to weathering and light are obtained.

The fine paste obtained by kneading is likewise suitable for pigmenting clear polyvinyl acetate emulsion paints, and for emulsion paints which contain copolymers of styrene and maleic acids as binders and emulsion paints based on polyvinyl propionate, polymethacrylate or butadiene/styrene.

EXAMPLE 20

10 g of the pigment paste mentioned in Example 19 are mixed with a mixture of 5 g of chalk and 5 g of 20% strength size solution. A red-brown wallpaper paint with which coatings of outstanding fastness to light are achieved is obtained. To prepare the pigment paste, it is also possible to use other non-ionic emulsifiers, such as the reaction products of nonylphenol and ethylene oxide, or ionic wetting agents, such as the sodium salts of alkylarylsulphonic acids, for example of dinaphthylmethanedisulphonic acid, sodium salts of substituted sulphonic acid esters and sodium salts of paraffinsulphonic acids, in combination with alkyl polyglycol ethers.

EXAMPLE 21

A mixture of 65 g of polyvinyl chloride, 35 g of diisooctyl phthalate, 2 g of dibutyl-tin mercaptide, 0.5 g of titanium dioxide and 0.5 g of the pigment of Example 1 is compounded on a mixing mill at 165° C. An intensely red-brown coloured composition which can be used for producing films or shaped articles is obtained. The colouration is distinguished by outstanding fastness to light and very good fastness to plasticisers.

EXAMPLE 22

0.2 g of the pigment according to Example 1 is mixed with 100 g of polyethylene granules, polypropylene granules or polystyrene granules. The mixture can be either injection-moulded directly in an injection-moulding machine at 220° to 280° C., or processed to coloured rods in an extruder or to coloured hides on a mixing mill. If appropriate, the rods and hides are granulated and the granules injection-moulded in an injection-moulding machine.

The red-brown moulded articles have very good fastness to light and migration. Synthetic polyamides of caprolactam or adipic acid and hexamethylenediamine, or the condensation products of terephthalic acid and ethylene glycol can be coloured in a similar manner at 280°-300° C., if appropriate under a nitrogen atmosphere.

EXAMPLE 23

1 g of the pigment according to Example 1, 10 g of titanium dioxide (rutile type) and 100 g of a pulverulent copolymer based on acrylonitrile/butadiene/styrene are mixed and the mixture is compounded on a roll mill at 140°-180° C. A red-brown coloured hide is obtained and is granulated and the granules are injection-moulded in an injection-moulding machine at 200°-250° C. Red-brown moulded articles of very good fastness to light and migration and excellent stability to heat are obtained.

Plastics based on cellulose acetate, cellulose butyrate and mixtures thereof can be coloured in shades with similar fastness properties in a similar manner, but at temperatures of 180°-220° C. and without the addition of titanium dioxide.

EXAMPLE 24

0.2 g of finely divided pigment according to Example 1 is mixed with 100 g of a plastic based on polycarbonate in an extruder or in a kneading screw at 250°-280° C. and the mixture is processed to granules. Red-brown, transparent granules of outstanding fastness to light and stability to heat are obtained.

EXAMPLE 25

90 g of a slightly branched polypropylene glycol with a molecular weight of 2,500 and a hydroxyl number of 56, 0.25 g of endoethylenepiperazine, 0.3 g of tin-II octoate, 1.0 g of a polyether siloxane, 3.5 g of water and 12.0 g of a paste of 10 g of the pigment according to Example 1 in 50 g of the polypropylene glycol indicated, are mixed thoroughly with one another, the mixture is then mixed intimately with 45 g of toluylene diisocyanate (80% of the 2,4-isomer and 20% of the 2,6-isomer), and the final mixture is poured into a mould. After 6 seconds, the mixture becomes cloudy and foams. After 70 seconds, an intensively red-brown coloured, soft polyurethane foam has formed, the pigmentation of which has outstanding fastness to light.

EXAMPLE 26

90 g of a slightly branched polyester of adipic acid, diethylene glcyol and trimethylolpropane which has a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated hydroxydiphenyl, 1.75 g of water and 12 g of a paste prepared by grinding 10 g of the pigment according to Example 1 in 50 g of the abovementioned polyester. After the mixing, 40 g of toluylene diisocyanate (65% and the 2,4-isomer and 35% of the 2,6-isomer) are stirred in and the mixture is poured into a mould and foamed. After 60 seconds, a red-brown coloured, soft polyurethane foam has formed, the colouration of which is distinguished by very good fastness to light.

EXAMPLE 27

Deep red-brown offset prints of very good fastness to light and lacquering are obtained with a printing paste prepared by grinding 35 g of the pigment according to Example 1 with 65 g of linseed oil and adding 1 g of siccative (Co naphthenate, 50% strength in white spirit). Using this printing paste in letterpress printing, cellotype printing, lithographic printing or die stamping leads to red-brown prints with similar fastness properties. If the pigment is used for colouring tinplate printing pastes or low-viscosity gravure printing pastes or printing inks, red-brown prints with similar fastness properties are obtained.

EXAMPLE 28

A printing paste is prepared from 10 g of the fine pigment paste indicated in Example 19, 100 g of 3% strength tragacanth gum, 100 g of an aqueous 50% strength egg albumin solution and 25 g of a non-ionic wetting agent. A textile fibre fabric is printed with this paste and steamed at 100° C. and a red-brown print which is distinguished by excellent fastness properties, in particular fastness to light, is obtained. Other binders which can be used for fixing the pigment onto the fibre, for example binders based on synthetic resin, or British gum or cellulose glycolate, can be used in the printing formulation instead of the tragacanth gum and egg albumin.

EXAMPLE 29

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded on a mixing mill at 50° C. and coloured with 2 g of the pigment obtained according to Example 1, and the final mixture is then vulcanised at 140° C. for 12 minutes. A red-brown coloured vulcanisation product of very good fastness to light is obtained.

EXAMPLE 30

22.5 l of an aqueous, approximately 9% strength viscose solution are added to 100 g of a 20% strength aqueous paste of the pigment according to Example 1, in a stirred apparatus, which paste has been prepared, for example, by dissolving the pigment in 96% strength sulphuric acid, discharging the solution onto ice, filtering the mixture and washing the material on the filter with water until neutral. The coloured composition is stirred for 15 minutes and then deaerated and subjected to a spinning and desulphurising process. Red-brown filaments or films with very good fastness to light are obtained.

EXAMPLE 31

10 kg of paper pulp containing 4 g of cellulose per 100 g are treated in a hollander for about 2 hours. During this period, 4 g of rosin size, then 30 g of an approximately 15% strength pigment dispersion obtained by grinding 4.8 g of the pigment obtained according to Example 1 with 4.8 g of dinaphthylmethanedisulphonic acid and 22 g of water in a ball mill, and then 5 g of alumnium sulphate are added, in each case at intervals of a quarter of an hour. After finishing on a papermaking machine, red-brown coloured paper of outstanding fastness to light is obtained.

EXAMPLE 32

The red-brown pigmented paper produced according to Example 31 is impregnated with a 55% strength solution of urea/formaldehyde resin in n-butanol and baked at 140° C. Red-brown laminated paper of very good fastness to migration and outstanding fastness to light is obtained.

Laminated paper with the same fastness properties is obtained by laminating paper which has been printed, by the gravure printing process, with a printing paste containing the fine red-brown pigment paste described in Example 19 and water-soluble or saponifiable binders.

EXAMPLE 33

20 g of the pigment obtained according to Example 1 are finely dispersed in 50 g of dimethylformamide in a bead mill, using a dispersing agent consisting of 50 g of a 10% strength solution of polyacrylonitrile in dimethylformamide. The pigment concentrate thus obtained is added to a spinning solution of polyacrylonitrile in a known manner and the spinning solution is homogenised and then spun to filaments by known dry spinning processes or wet spinning processes.

Red-brown coloured filaments, the colourations of which are distinguished by very good fastness to rubbing, washing, migration, heat, light and weathering, are obtained.

We claim:
1. An anthraquinone-azomethine compound of the formula

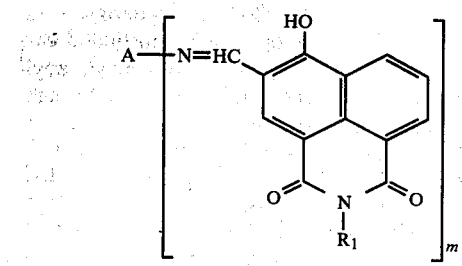

or of the tautomeric formula

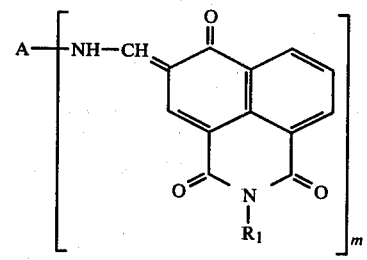

in which
A denotes an anthraquinone radical which is free from sulphonic acid groups and is optionally further substituted by halogen, $C_1$-$C_4$ alkyl, $C_1$-$C_4$ alkoxy, $C_1$-$C_4$ alkylamino, benzylamino, cyclohexylamino, $C_1$-$C_4$ alkylmercapto, phenylmercapto which is optionally substituted by $C_1$-$C_4$ alkyl, $C_1$-$C_4$ alkoxy, fluorine, chlorine, bromine or nitro, $C_1$-$C_4$ alkylcarbonyl, $C_1$-$C_4$ alkoxycarbonyl, phenylamino which is optionally substituted by $C_1$-$C_4$ alkyl, $C_1$-$C_4$ alkoxy, bromine, chlorine or nitro, carbamoyl which is optionally monsubstituted or disubstituted by $C_1$-$C_4$ alkyl, benzyl or phenyl, it being possible for phenyl to be substituted by $C_1$-$C_4$ alkyl, $C_1$-$C_4$ alkoxy, fluorine, chlorine, bromine or nitro, carboxyl, hydroxyl, $C_1$-$C_4$ alkylcarbonylamino, benzoylamino which is optionally substitued by $C_1$-$C_4$ alkyl, $C_1$-$C_4$ alkoxy, chlorine, bromine or nitro, $C_1$-$C_4$ alkyl sulphonylamino or benzenesulphonylamino which is optionally substituted by $C_1$-$C_4$ alkyl, $C_1$-$C_4$ alkoxy, fluorine, chlorine, bromine or nitro;
$R_1$ denotes hydrogen, an optionally substituted aryl group of the formula

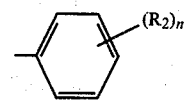

wherein the aryl group can be substituted by halogen, $C_1$-$C_4$ alkyl, $C_1$-$C_4$ alkoxy, nitro, trifluoromethyl or cyano, hetero-aryl, cycloalkyl or $C_1$-$C_{12}$ alkyl, it being possible for the alkyl chain to be interrupted by oxygen or sulphur and/or to be substituted by hydroxyl groups of $N(R_3)_2$ groups, $-N(R_3)_3$ or

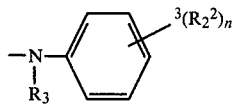

$R_2$ denotes halogen, $C_1$–$C_4$ alkyl, $C_1$–$C_4$ alkoxy, nitro, trifluoromethyl, cyano, optionally substituted carbamoyl optionally substituted sulphamoyl, acylamino or optionally substituted arylamino, the substituents on the optionally substituted carbamoyl or sulphamoyl being $C_1$–$C_4$ alkyl, phenyl which in turn is optionally substituted by $C_1$–$C_4$ alkyl, $C_1$–$C_4$ alkoxy, chlorine, bromine or nitro and benzyl, the substituents on the aryl amino being $C_1$–$C_4$ alkyl, $C_1$–$C_4$ alkoxy, fluorine, chlorine, bromine or nitro;

$R_3$ denotes hydrogen, $C_1$–$C_4$ alkyl, cycloalkyl or optionally substituted aryl where the substituents are halogen, $C_1$–$C_4$ alkyl, $C_1$–$C_4$ alkoxy, nitro, trifluoromethyl or cyano;

m denotes 1, 2, 3 or 4 and n denotes 1, 1, 2, 3, 4 or 5.

2. Anthraquinone-azomethine compounds which, in one of their tautomeric structures, correspond to the formula

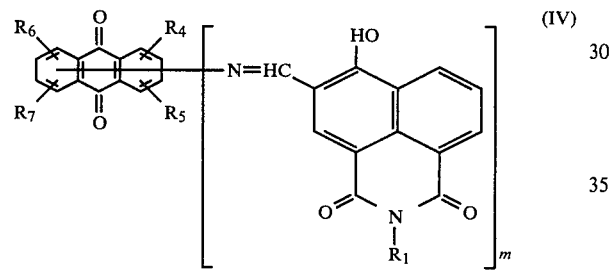

(IV)

wherein $R_1$ and m have the meaning indicated above, $R_4$ denotes hydrogen, halogen, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkylcarbonyl, $C_1$–$C_4$-alkoxycarbonyl, phenylamino which is optionally substituted by $C_1$–$C_4$-alkyl, $C_1$–$C_4$-alkoxy, chlorine or nitro, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-alkylcarbonylamino, benzoylamino which is optionally substituted by $C_1$–$C_4$-alkyl, $C_1$–$C_4$-alkoxy, chlorine, bromine or nitro, or benzenesulphonylamino which is optionally substituted by $C_1$–$C_4$-alkyl, $C_1$–$C_4$-alkoxy, fluorine, chlorine, bromine or nitro, $R_5$ denotes hydrogen, chlorine, hydroxyl or methyl, $R_6$ denotes hydrogen, halogen, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, $C_1$–$C_4$-alkoxycarbonyl, $C_1$–$C_4$-alkylcarbonyl, benzylamino, cyclohexylamino, phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, $C_1$–$C_4$-alkylcarbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or benzenesulphonylamino which is optionally substituted by $C_1$–$C_4$-alkyl, $C_1$–$C_4$-alkoxy, fluorine, chlorine, bromine or nitro and $R_7$ denotes hydrogen, halogen, such as fluorine, chlorine and bromine, or hydroxyl.

3. Anthraquinone-azomethine compounds which, in one of their tautomeric structures, correspond to the formula

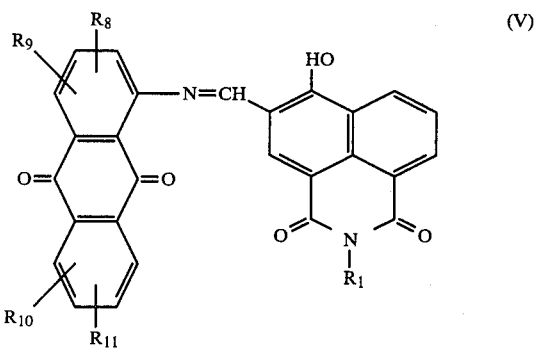

(V)

wherein $R_1$ has the meaning indicated above and $R_8$, $R_9$, $R_{10}$ and $R_{11}$ denote hydrogen, chlorine, bromine, carboxyl, $C_1$–$C_4$-alkoxycarbonyl, carbamoyl, $C_1$–$C_4$-alkylcarbonylamino, benzoylamino which is optionally substituted by 1 or 2 nitro groups or 1 to 5 chlorine or bromine atoms, $C_1$–$C_4$-alkylsulphonylamino, benzenesulphonylamino which is optionally substituted by methyl, methoxy or chlorine, or a radical of the formula

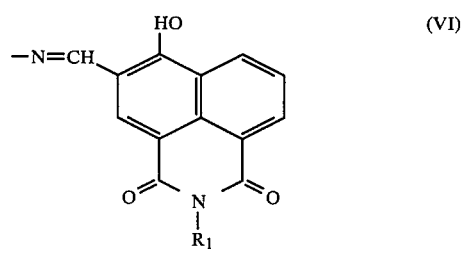

(VI)

* * * * *